United States Patent
Mains

[11] 3,709,529
[45] Jan. 9, 1973

[54] WELD JOINT
[75] Inventor: Robert T. Mains, Euclid, Ohio
[73] Assignee: Parker-Hannifin Corporation, Cleveland, Ohio
[22] Filed: Aug. 3, 1970
[21] Appl. No.: 60,589

[52] U.S. Cl. ............... 285/286, 29/501, 29/472.1, 287/189.36 B
[51] Int. Cl. ........................................ F16l 13/02
[58] Field of Search ...... 285/286, 21, 22, 27; 29/501, 29/498.5, 503, 472.1; 287/189.36 B

[56] References Cited

UNITED STATES PATENTS

| | | | |
|---|---|---|---|
| 2,732,229 | 1/1956 | Gaum | 285/21 |
| 2,792,490 | 5/1957 | Risch et al. | 285/22 X |
| 3,026,910 | 3/1962 | Cawker et al. | 285/21 X |
| 2,129,583 | 9/1938 | Johansson | 29/501 X |
| 2,153,287 | 4/1939 | Wallace et al. | 29/501 X |
| 2,741,932 | 4/1956 | Whitney et al. | 29/501 X |

Primary Examiner—David J. Williamowsky
Assistant Examiner—Wayne L. Shedd
Attorney—Oberlin, Maky, Donnelly & Renner

[57] ABSTRACT

A weld joint for a fuel injection nozzle assembly and the like characterized in that axially interfitting tubular parts define therebetween an annular groove or gap of which one side has an axial step radially spaced outwardly from the bottom of the groove and radially spaced inwardly from the radially outer edge of the side of the groove. A metallic filler ring axially spans said groove and is coaxially located by said step to radially outwardly space its inside and outside surfaces respectively from the bottom of said groove and from the radially outer edges of the sides of said groove. The outside surface of the filler ring extends radially outward beyond the outer portions of the sides of the groove. The protruding portion of the weld ring permits fusion welding of the parts without addition of weld filler material. After the parts are welded together, the weld ring is integrally bonded to the adjacent portions of the sides of the groove to form a strong leakprrof joint between said nozzle parts. Another characterizing feature of the weld joint herein is that a flow divider valve or the like contained within the nozzle assembly can be repeatedly serviced or replaced by simply cutting through the filler ring with the point or tip of the tool entering the space between the bottom of the groove and the inside surface of the filler ring thus to permit separation of the nozzle parts where they are axially interfitted without burn up of the tip of the tool and to permit subsequent reassembly and welding of said parts with the filler ring being the only new part required.

5 Claims, 5 Drawing Figures

PATENTED JAN 9 1973
3,709,529
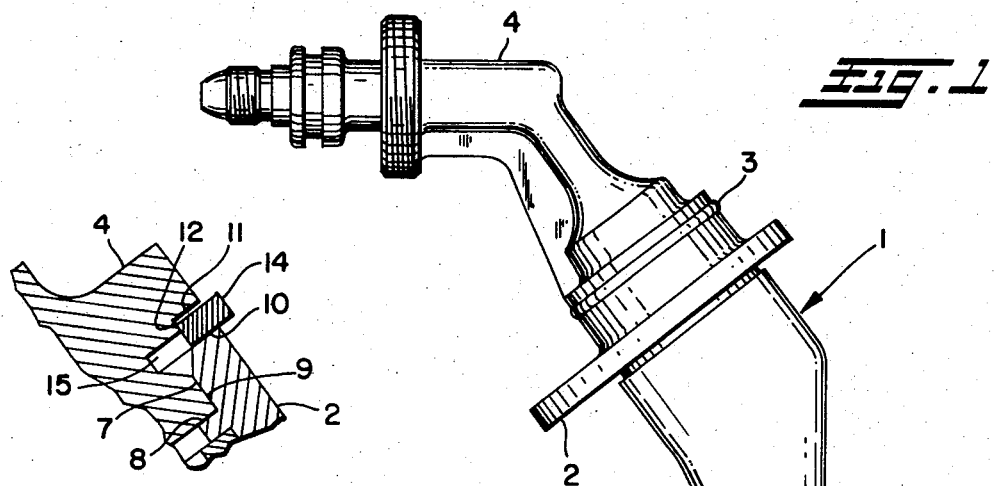
Fig. 1
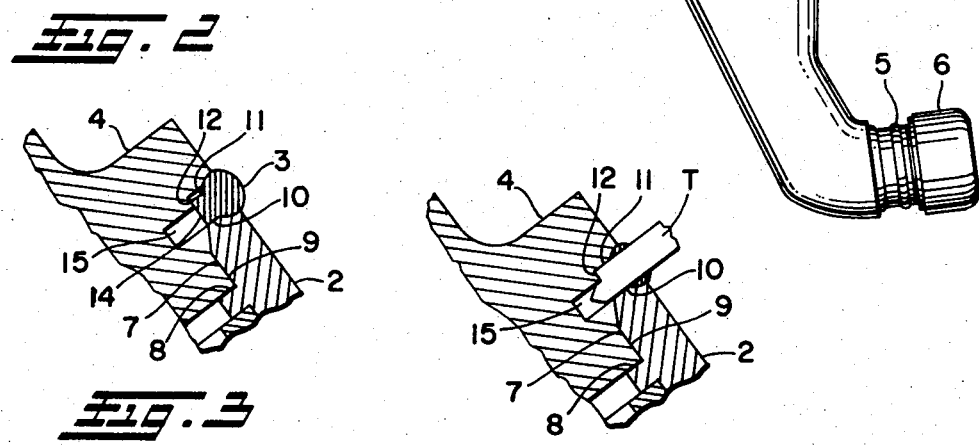
Fig. 2
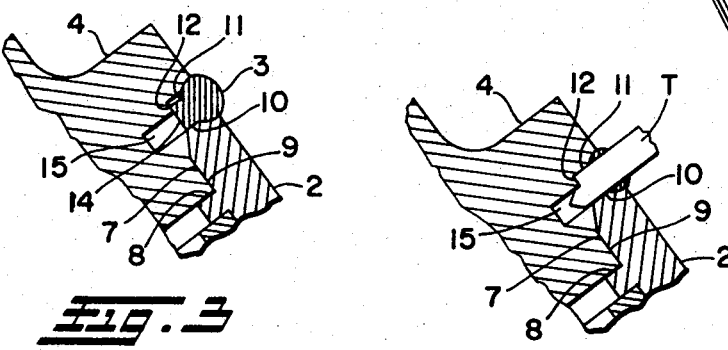
Fig. 3
Fig. 4
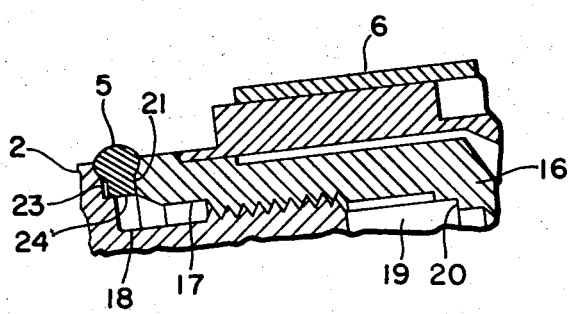
Fig. 5
INVENTOR.
ROBERT T. MAINS
BY
Oberlin, Maky, Donnelly & Renner
ATTORNEYS

WELD JOINT

BACKGROUND OF THE INVENTION

It is of course known in the art of injection nozzle manufacture to provide welded (or brazed) joints between the parts thereof to provide a strong leakproof nozzle assembly, such joints generally comprising telescoped parts which define therebetween a V-shaped groove or an internal corner into which welding metal is deposited. This is, of course, satisfactory insofar as performance is concerned, but in portions of the nozzle assembly wherein servicing or replacement of parts may be required, the separation of the parts where welded together may, as a practical matter, be impossible or difficult without affecting re-use of parts because of flow of welding metal between interfitting portions of the parts.

Where it may be necessary or desirable to separate nozzle parts which have been welded together, it is known from the Cleminshaw et al. U. S. Pat. No. 3,024,045, granted Mar. 6, 1962, to provide a ring of refractory material such as carbon, between annular axially spaced end faces of parts which are threaded together and to weld together the opposed end faces of the parts, the refractory ring constituting a barrier to prevent radial inward flow of the welding metal to be interengaged threads of the nozzle parts, whereby, when it is desired to separate the nozzle parts, the weld metal may be cut down to the outside diameter of the refractory ring.

SUMMARY OF THE INVENTION

In contradistinction to known welded joints of the type just described, in the present weld joint the axially interfitting nozzle parts have a metallic filler ring in the annular groove or gap which is defined between the parts. The outside surface of the filler ring extends radially outward beyond the outer portions of the sides of the groove. The protruding portion of the weld ring permits fusion welding of the parts without addition of weld filler material. After the parts are welded together, the weld ring is integrally bonded to the adjacent portions of the sides of the groove to form a strong leakproof joint between said nozzle parts. In addition, the filler ring is radially spaced from the bottom of the groove so that when the parts are to be separated the tip of the cutting tool will, in cutting through the filler ring, enter the annular space between the inner surface of the filler ring and the bottom of the groove, whereby tool tip burn up is prevented.

As a further feature of this invention the telescoped or threadedly engaged portions of the nozzle parts are axially spaced from the weld area and are radially between the bottom of the groove and the inside diameter of the filler ring so that these portions will not be bonded by the fusion weld and therefore, the nozzle parts may readily be separated upon cutting through the filler ring.

Yet another characterizing feature of this invention is that one of the sides of said groove or gap defined between the welded together parts is formed with an axial step which is engaged by the inner surface of the filler ring thus to coaxially locate the latter in said groove with its outer surface outward with respect to the remaining outwardly extending portions of the sides of the groove and with its inner surface radially spaced outwardly from the bottom of the groove. The axially interfitting nozzle parts also have interengaged radially overlapping surfaces which predeterminedly locate them axially with respect to each other, and the filler ring is of axial length slightly less than the width of the groove defined between said parts so as to permit such interengagement of the radially overlapping surfaces while allowing control of the inward penetration of the fusion weld with respect to the inward surface of the filler ring.

Other objects and advantages of the present invention will appear hereinafter.

BRIEF DESCRIPTION OF THE DRAWING

FIG. 1 is a side elevation view of a dual orifice fuel injection nozzle having a fuel inlet port at one end, a dual orifice injection nozzle at the other end, and a flow divider valve between the ends to control flow of fuel to the secondary orifice of the nozzle, the housing having a primary fuel passage through which fuel from the inlet port flows through the primary orifice of the nozzle;

FIG. 2 is a much enlarged fragmentary radial cross-section view of the joint herein between the fuel inlet connector and the nozzle housing showing the metal filler ring interposed between axially spaced apart annular end faces of the connector and housing respectively;

FIG. 3 is a view similar to FIG. 2 except showing the completed fusion weld joint with the filler ring integrally bonded to the connector and housing;

FIG. 4 is a view similar to FIGS. 2 and 3 except showing how the welded joint may be cut apart with the tip of the cutting tool disposed in the internal annular space between the connector and housing; and FIG. 5 is an enlarged cross-section view of a weld joint between the nozzle housing and the secondary orifice body member which has threaded engagement with the nozzle housing.

DETAILED DESCRIPTION OF THE INVENTION

The nozzle assembly 1 herein shown for purposes of illustration comprises a nozzle housing 2 having welded at 3 to its upper end a fuel inlet connector 4 and having welded at 5 to its lower end a dual orifice fuel injection nozzle 6. Between the connector 4 and the housing 2 is a flow divider or variable area valve (not shown) around which fuel flows through a primary passage which leads to the primary orifice of the nozzle 6 and through which the flow of fuel from the connector 4 is controlled for flow through a secondary passage to the secondary orifice of the nozzle 6. For an example of the general type of flow divider which may be contained within the housing 2 between the connector 4 and housing 2, reference may be had to the patent to Davies et al. U.S. Pat. No. 3,022,954, dated Feb. 27, 1962. As an example of a dual orifice nozzle 6, reference may be had to the aforesaid Cleminshaw et al. U.S. Pat. No. 3,024,045, granted Mar. 6, 1962, the nozzle 6 herein being of somewhat modified construction as hereinafter set forth.

Referring now in detail to the welded joint 3 between the connector 4 and the housing 2, the upper end of the housing is provided with a chamfered counterbore 7 which provides a stop shoulder 8 engaged by the end of the connector 4 which has a cylindrical portion 9 telescoped within said counterbore 7. As shown, the annular end face 10 of the housing 2 is axially spaced and radially outwardly spaced from the telescoped portions 9 and 7 of the connector 4 and housing 2.

The connector 4 has a stepped annular face 11 of which the outer annular portion is axially spaced from and opposite the annular end face 10 of the housing 2, the axial spacing being determined by engagement of the connector 4 with the stop shoulder 8 in the housing 2. The inner portion of the end face 11 constitutes one side of a peripheral groove which is of diameter less than the diameter of the counterbore 7 and cylindrical portion 9. The other side of the peripheral groove is beveled as shown to meet the cylindrical portion 9 at about the same place that the chamfer meets the counterbore 7.

Between the opposed spaced apart annular end faces 10 and 11 and located by the axial step 12 in coaxial relation between the connector 4 and housing 2 is a filler ring 14 of metal the same as or similar to that of the connector 4 and housing 2, for example, No. 347 stainless steel. Said filler ring 14 has an outside diameter greater than the outside diameter of the annular end faces 10 and 11 and is of axial length from say, 0.001 to 0.006 inch less than the axial distance between said end faces 10 and 11.

When joint 3 is fusion welded as shown in FIG. 3 with the molten metal bridging the gap between said end faces 10 and 11 all but the inner portion of the filler ring 14 becomes integrally welded to the connector 4, and housing 2 to form a strong leakproof joint. In welding the joint 3 the amount of weld penetration may be varied but it is preferred that the radially inner portions of the ends of the filler ring 14 not be welded to the juxtaposed portions of the end faces 10 and 11. However, even if the weld 3 does penetrate to the inside diameter of the filler ring 14, the weld metal is yet isolated from the interfitting cylindrical surfaces 7 and 9 which are axially and radially spaced from the weld joint 3.

In order to separate the connector 4 and housing 2, a tool T as shown in FIG. 4 may be employed, and when the tip of the tool T breaks into the annular space 15 within the inner surface of the filler ring 14 there will be no burn up of the tool tip or nozzle parts 2 or 4. When the tool T has penetrated the filler ring 14 the connector 4 and housing 2 may readily be separated for servicing or replacement of the flow divider therewithin. If desired, the tool T may be provided with side cutting edges as shown to conform with the initial formation of the annular end faces 10 and 11 so that the housing 2 and connector 4 may be rewelded, using a new filler ring 14.

The weld joint 5 between the lower end of the housing 2 and the dual orifice nozzle 6 is generally of the same type as just described except that the secondary orifice body 16 has screw threaded engagement with the housing 2, the counterbore 17 of the secondary orifice body 16 being larger than the major diameter of the threads and the groove 18 in the housing 2 being smaller than the minor diameter of the threads, thus again to axially and radially space the axially interfitting portions of the housing and body parts 2 and 16 from the weld joint 5. In this example, the primary orifice body 19 is clamped between the shoulder 20 of the secondary orifice body 16 and the end of the housing 2, thus to locate the annular end face 21 of the secondary body 16 in spaced relation with respect to the stepped annular end face 23 of the housing 2 so that initially the filler ring 24 will be loosely disposed between said end faces with a clearance of say, from 0.001 to 0.006 inch.

I, therefore, particularly point out and distinctly claim as my invention:

1. A weld joint between axially interfitting inner and outer parts of a fuel injection nozzle assembly of which the outer part terminates in an annular end wall and of which the inner part has a peripheral groove having a bottom wall of diameter less than the inside diameter of said annular end wall and having a side wall of which the radially outer portion faces, and is axially spaced from, said annular end wall; and a metallic filler ring between said side and end walls of inside diameter greater than the diameter of said bottom wall fusion welded to the radially outer portion of said side wall and to said annular end wall.

2. The weld joint of claim 1 wherein said filler ring is fusion welded to said side wall and annular end wall only at diameters greater than the inside diameter of said annular end wall; the ends of said filler ring radially inward of said fusion welds being in close proximity to said side wall and to said annular end wall.

3. The weld joint of claim 1 wherein said side wall has a cylindrical step on which the inside diameter of said filler ring is piloted to locate said filler ring coaxially between said inner and outer parts.

4. The weld joint of claim 3 wherein said cylindrical step is of diameter substantially equal to the inside diameter of said filler ring and to the inside diameter of said annular end wall; said filler ring being fusion welded to said side wall and to said annular end wall only at diameters greater than the diameter of said cylindrical step and greater than the inside diameter of said annular end wall.

5. The weld joint of claim 4 wherein said filler ring is of outside diameter greater than the outside diameters of said side wall and said annular end wall and forms a rounded weld bead between said side wall and said annular end wall.

* * * * *